(12) United States Patent
Potthoff

(10) Patent No.: US 6,395,139 B1
(45) Date of Patent: May 28, 2002

(54) FEED DISTRIBUTOR FOR A LIQUID DISTRIBUTOR OF A DISTILLATION COLUMN

(75) Inventor: Richard W. Potthoff, Scotch Plains, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/607,785

(22) Filed: Jun. 30, 2000

Related U.S. Application Data

(63) Continuation-in-part of application No. 09/183,563, filed on Oct. 30, 1998, now abandoned.

(51) Int. Cl.[7] .............................. B01D 3/00; B01D 1/30
(52) U.S. Cl. ...................... 202/262; 137/262; 159/15; 159/26.2; 159/43.1; 202/270; 261/97
(58) Field of Search ........................ 202/158, 262, 202/270; 159/43.1, 15, 26.2; 137/262; 165/147; 261/97, 98

(56) References Cited

U.S. PATENT DOCUMENTS

| 3,158,171 A | 11/1964 | Eckert | 137/262 |
| 4,782,857 A | * 11/1988 | Bieri | 137/561 A |
| 5,770,020 A | * 6/1998 | Koistinen et al. | 202/172 |
| 5,776,316 A | * 7/1998 | Potthoff et al. | 202/158 |
| 5,904,807 A | * 5/1999 | Ramm-Schmidt et al. | 159/43.1 |

FOREIGN PATENT DOCUMENTS

| GB | 976036 | 8/1963 |
| WO | 9508381 | * 3/1995 |

* cited by examiner

*Primary Examiner*—Virginia Manoharan
(74) *Attorney, Agent, or Firm*—Wan Yee Cheung; Salvatore P. Pace

(57) ABSTRACT

There is provided a feed distributor for feeding liquid to a liquid distributor. The feed distributor has an elongated body sized to extend across the liquid distributor and an inlet defined in the one of the ends thereof. One or more passageways are provided within the body extending between the ends of the body. Each passageway has an elongated outlet configured to discharge the liquid across the liquid distributor. Each passageway has a taper configured to promote a constant liquid velocity within the passageway. As a result, a uniform liquid distribution of the liquid out of the elongated outlet and therefore to the liquid distributor are promoted.

5 Claims, 2 Drawing Sheets

FEED DISTRIBUTOR FOR A LIQUID DISTRIBUTOR OF A DISTILLATION COLUMN

RELATED APPLICATIONS

This application is a continuation-in-part of U.S. patent application Ser. No. 09/183,563 filed Oct. 30, 1998, now abandoned.

BACKGROUND OF THE INVENTION

The present invention relates to a feed distributor for feeding liquid to a liquid distributor housed within a distillation column. More particularly, the present invention relates to such a feed distributor in which at least one elongated tapered passageway having a perforate sidewall is provided for the discharge of liquid to the liquid distributor.

Distillation columns can be provided with various types of packing that is arranged in beds along the length of the distillation column. The packing is used to bring liquid and vapor phases of the mixture to be separated into close physical contact. In conducting a distillation process, it may be necessary to feed liquid to one or more locations of the column. Such liquid is fed into the column by a feed distributor that in turn feeds a liquid distributor in the column. The liquid distributor functions to distribute liquid to the next underlying bed of packing.

In order for a distillation column to properly function, it is necessary that any liquid distributed to a bed of packing remains well mixed so that its concentration across the column is relatively constant. In order to ensure consistency, the feed distributor is designed to feed liquid relatively evenly across the liquid distributor. Often, such feed distributors are in the form of pipes with openings in the bottom. In accordance with the present invention, it has been found that such feed distributors preferentially feed more liquid at the far end of the pipe and less liquid at the inlet end thereof. This tends to produce uneven distribution of liquid in a transverse direction of the column. The resultant variance in the concentration of liquid across the column will frequently yield a fall-off in expected performance.

As will be discussed, the present invention provides a feed distributor that promotes uniform liquid distribution along the length thereof and, hence, an even distribution of liquid to the liquid distributor.

SUMMARY OF THE INVENTION

The present invention provides a feed distributor for feeding liquid to a liquid distributor. The feed distributor has an elongated body sized to extend across the liquid distributor. The elongated body has first and second ends, an inlet defined in the first of the ends, and at least one passageway extending between the first and second ends. The passageway has an elongated outlet configured to discharge the liquid across the liquid distributor. Additionally, the at least one passageway has a taper taken in a direction from the first to the second of the ends to promote a constant liquid velocity within the passageway and therefore, a uniform liquid distribution of the liquid out of the elongated outlet along the length thereof and therefrom to the liquid distributor.

BRIEF DESCRIPTION OF THE DRAWINGS

While the specification concludes with claims distinctly pointing out the subject matter that Applicant regard as his invention, it is believed that the description of the invention will be better understood when taken in connection with the accompanying drawings in which:

DETAILED DESCRIPTION OF THE INVENTION

Figure 1:
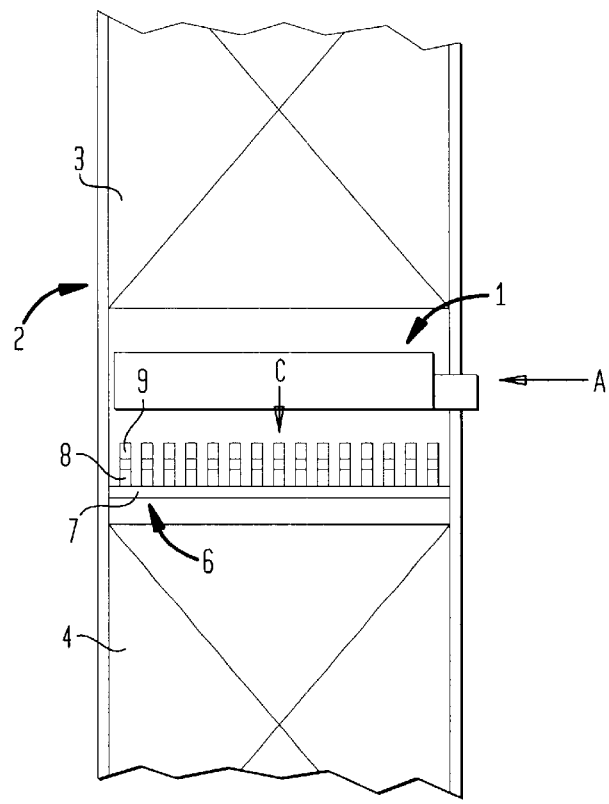
FIG. 1 is a fragmentary view of a distillation column with portions broken away to illustrate the placement of a feed distributor therein in accordance with present invention.

With reference to FIG. 1, a feed distributor 1 in accordance with the present invention is illustrated as being located within a distillation column 2 between packed beds 3 and 4. The packing in the beds 3 and 4 can be either random or structured packing. The placement of the feed distributor 1 in the distillation column 2 illustrated in FIG. 1 is not intended as being limiting on the present invention since the feed distributor 1 can be placed, e.g. on top of the column 2 as well. The liquid is fed into feed distributor 1 as indicated by arrow A and is discharged to a liquid distributor 6 in a direction shown by arrow C.

Figure 2:
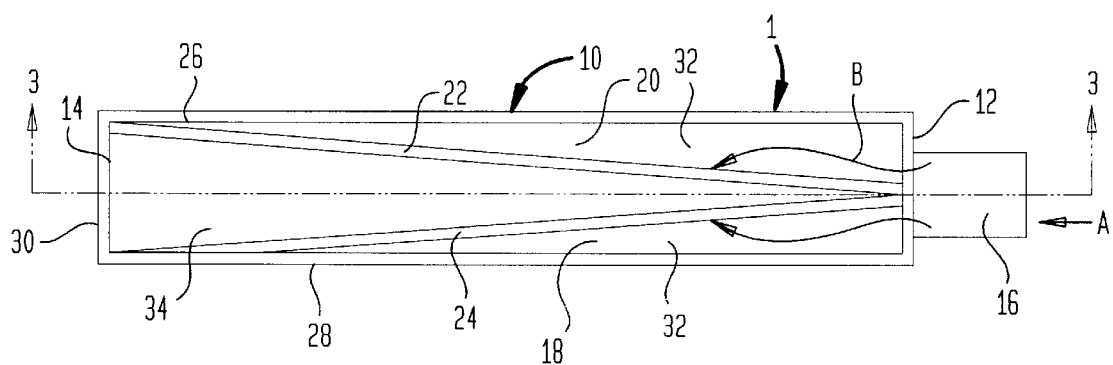
FIG. 2. is a top plan view of the feed distributor of the present invention.

Turning to FIG. 2, feed distributor 1 has an elongated body 10, sized to extend across liquid distributor 6 as shown in FIG. 1. The body has first and second ends 12 and 14. An inlet 16 is defined at first end 12 to communicate with passageways 18 and 20 extending between first and second ends 12 and 14. Each of the passageways 18 and 20 has two sidewalls. One of the sidewalls of each of passageways 18 and 20 is a perforate sidewall 22 and 24, respectively, whereas the remaining sidewalls are imperforation sidewalls 26 and 28, respectively. Liquid, as previously stated, enters feed distributor 1 in the direction of arrow A and flows along passageways 18 and 20, then out of perforate sidewalls 22 and 24 as indicated by arrows B. Perforate sidewalls 22 and 24 serve as elongated outlets configured to discharge the liquid along the length of elongated body 10 and therefore across liquid distributor 6.

Passageways 18 and 20 formed by perforate side walls 22 and 24 and imperforate sidewalls 26 and 28, respectively, are joined by an end wall 30. A base wall 32 underlying passageways 18 and 20 is provided with a central cutout 34. Central cutout 34 is laterally defined by perforate side walls 22 and 24 and end wall 30 through which liquid that flows from perforate side walls 22 and 24 passes in the direction of arrow C as illustrated in FIG. 1.

Each of passageways 18 and 20 is provided with a taper taken in the direction from first end 12 to second end 14. It will be appreciated by those of ordinary skill in the art that it is not essential that the imperforate sidewalls 26 and 28 be parallel as illustrated in FIG. 2, or that there be two passageways, as will be discussed below. However, it is necessary that passageways 18 and 20 taper toward end 14 such that passageways 18 and 20 become progressively more narrow toward end 14. This taper promotes a constant liquid velocity in passageways 18 and 20 at a variety of liquid flow rates into feed distributor 1. As a result, there is a uniform liquid distribution of liquid out of perforate sidewalls 22 and 24 which, in turn, promotes a uniform distribution across liquid distributor 6. It is to be noted that liquid distributor 6, as illustrated in FIG. 1, is of a type that is provided with an apperturned plate 7, vapor risers 8 and hats 9 to collect liquid and distribute it onto plate 7.

However, this particular form of a liquid distributor is not preferred and other conventional configurations can be utilized as well.

Figure 3:
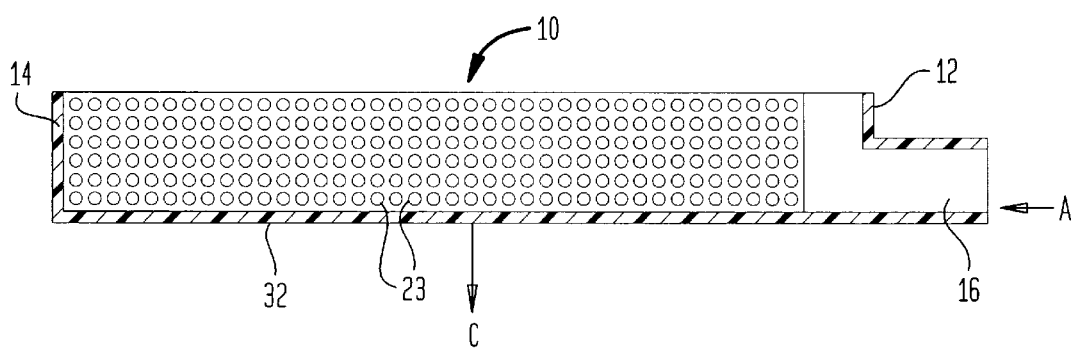
FIG. 3. is a sectional view of the feed distributor illustrated in FIG. 2 taken along lines 3—3 thereof.

FIG. 3, illustrates a side view of the feed distributor of the invention taken along the lines 3—3 in FIG. 2. Specifically, FIG. 3 shows a side view of perforate sidewall 22, 24 in FIG. 2 illustrating the perforations 23 that form the elongated outlet in the passageways 18 and 20 as illustrated in FIG. 2. FIG. 3 illustrates the relation between the elongated outlet formed by perforations 23 and first end wall 12, second end wall 14, inlet 16 and base wall 32. It is to be noted in accordance with the present invention that the elongated outlet in passageways 18 and 20 is not restricted to being defined by circular perforations 23, but may consist of any art-recognized comparable openings, e.g. slots, transverse the length of passageways 18, 20 that would permit fluid to flow therefrom as described herein.

Figure 4:
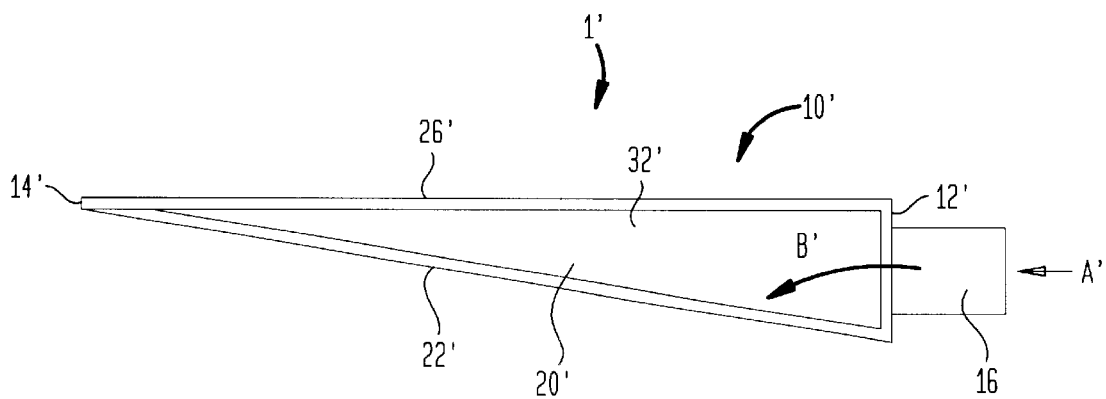
FIG. 4 is a top plan view of an alternative embodiment of a feed distributor of the present invention.

FIG. 4 which has the same structures labeled with primed numbers as in FIG. 2, illustrates an alternative embodiment of a feed distributor in accordance with the present invention designated by reference numeral 1' in which a single passageway is provided. To this end, feed distributor 1' comprises a body 10', a passageway 20' including a first end wall 12', a perforate side wall 22' and an imperforate side wall 26' and base wall 32'. In the embodiment illustrated in FIG. 4, end wall 14' is defined by the joinder of sidewalls 22' and 26', and perforated sidewall 22' tapers in the direction of the joinder. Liquid enters through inlet 16' as indicated by arrow A' and flows out of the elongated outlet formed by perforate sidewall 22' as indicated by arrow B'.

While the present invention has been described with reference to a preferred environment, as well occur to the art, numerous changes, additions and omissions may be made without departing from the spirit and scope of the present invention.

What is claimed is:

1. A feed distributor for feeding liquid to a liquid distributor comprising: an elongated body sized to extend across said liquid distributor, said elongated body having first and second ends, an inlet defined in the first of said ends, and at least one passageway extending between said first and second ends and having an elongated outlet sized to discharge said liquid across said liquid distributor, said at least one passageway having two opposed sidewalls, one of which contains said elongated outlet, said passageway having a taper in at least the sidewall containing said elongated outlet, the taper being in a direction taken from said first to said second ends, said taper promoting a constant liquid velocity within said passageway and, thereby, a uniform liquid distribution of said liquid out of said elongated outlet along the length thereof and to said liquid distributor; wherein said elongated outlet is defined by a series of perforations in said sidewall.

2. A feed distributor in accordance with claim 1, wherein said perforations in said sidewall are circular perforations.

3. A feed distributor for feeding liquid to a liquid distributor comprising: an elongated body sized to extend across said liquid distributor, said elongated body having first and second ends, an inlet defined in the first of said ends, and at least one passageway extending between said first and second ends and having an elongated outlet sized to discharge said liquid across said liquid distributor, said at least one passageway having two opposed sidewalls, one of which contains said elongated outlet, said passageway having a taper in at least the sidewall containing said elongated outlet, the taper being in a direction taken from said first to said second ends, said taper promoting a constant liquid velocity within said passageway and, thereby, a uniform liquid distribution of said liquid out of said elongated outlet along the length thereof and to said liquid distributor; wherein said at least one passageway comprises two passageways and the sidewalls of said passageways containing said elongated outlets are opposed and face each other and said passageways are tapered away from each other in the direction of said second end.

4. A feed distributor in accordance with claim 3, wherein the sidewalls of said passageways are joined at said second end of said elongated body with each other and with an end wall, said feed distributor further having a base wall under each of said passageways, said base wall having a central opening to allow said fluid to pass through to said fluid distributor, said opening being defined by being laterally bound by said side walls containing the elongated outlets.

5. A feed distributor for feeding liquid to a liquid distributor comprising: an elongated body sized to extend across said liquid distributor, said elongated body having first and second ends, an inlet defined in the first of said ends, and at least one passageway extending between said first and second ends and having an elongated outlet formed by perforations sized to discharge said liquid across said liquid distributor, said at least one passageway having two opposed sidewalls, one of which contains said elongated outlet, said passageway having a taper in at least the sidewall containing said elongated outlet, the taper being in a direction taken from said first to said second ends, said taper promoting a constant liquid velocity within said passageway and, thereby, a uniform liquid distribution of said liquid out of said elongated outlet along the length thereof and to said liquid distributor; wherein said elongated body comprises a single passageway, wherein said second end is the joinder of said two sidewalls and said passageway is tapered in the direction of said second end joinder.

* * * * *